United States Patent
Iwade et al.

(10) Patent No.: US 7,424,820 B2
(45) Date of Patent: Sep. 16, 2008

(54) KNOCKING STATE DETERMINATION DEVICE

(75) Inventors: Kiyoshi Iwade, Okazaki (JP); Nobuyuki Murate, Okazaki (JP); Shuhei Oe, Kariya (JP); Rihito Kaneko, Nishikamo-gun (JP); Kenji Kasashima, Nishikamo-gun (JP); Yuichi Takemura, Anjo (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 53 days.

(21) Appl. No.: 11/475,231

(22) Filed: Jun. 27, 2006

(65) Prior Publication Data

US 2007/0084267 A1 Apr. 19, 2007

(30) Foreign Application Priority Data

Jun. 28, 2005 (JP) .............................. 2005-188618

(51) Int. Cl.
*G01L 23/22* (2006.01)
*F01P 5/14* (2006.01)

(52) U.S. Cl. .................. 73/35.01; 73/35.04; 123/406.38
(58) Field of Classification Search ................ 73/35.01, 73/35.03, 35.04, 35.06; 123/406.33, 406.38, 123/406.51; 702/56
See application file for complete search history.

(56) References Cited

U.S. PATENT DOCUMENTS

| | | | |
|---|---|---|---|
| 4,993,387 A * | 2/1991 | Sakakibara et al. .... | 123/406.33 |
| 5,134,980 A * | 8/1992 | Sakakibara et al. .... | 123/406.38 |
| 5,215,058 A | 6/1993 | Sakakibara et al. | |
| 5,355,853 A | 10/1994 | Yamada et al. | |
| 6,688,286 B2 * | 2/2004 | Kokubo et al. ......... | 123/406.33 |
| 6,845,312 B1 | 1/2005 | Cross et al. | |
| 6,867,691 B2 * | 3/2005 | Nishimura .................. | 340/439 |
| 2002/0179053 A1 | 12/2002 | Kokubo et al. | |
| 2003/0005749 A1 | 1/2003 | Nishimura | |

FOREIGN PATENT DOCUMENTS

| | | |
|---|---|---|
| EP | 0 346 799 A2 | 12/1989 |
| JP | 1-315649 | 12/1989 |
| JP | 2001-227400 | 8/2001 |
| JP | 2003-21032 | 1/2003 |

\* cited by examiner

*Primary Examiner*—Helen C. Kwok
(74) *Attorney, Agent, or Firm*—Oblon, Spivak, McClelland, Maier & Neustadt, P.C.

(57) ABSTRACT

An engine ECU executes a program including a step of calculating intensity values LOG(V) based on signals transmitted from a knock sensor; a step of deciding a maximum value V(MAX) in frequency distribution of intensity values LOG(V) for N cycles (N is a natural number); a step of calculating a knock determination level V(KD) based on the frequency distribution; a step of, when the knock determination level V(KD) is smaller than the maximum value V(MAX), removing V(MAX) from the frequency distribution; and a step of counting the total frequency of removed maximum values V(MAX) as knock occupancy KC. Maximum values V(MAX) are removed until the knock determination level V(KD) and the maximum value V(MAX) coincide, and the knock determination level V(KD) is recalculated.

15 Claims, 10 Drawing Sheets

F I G. 1 2
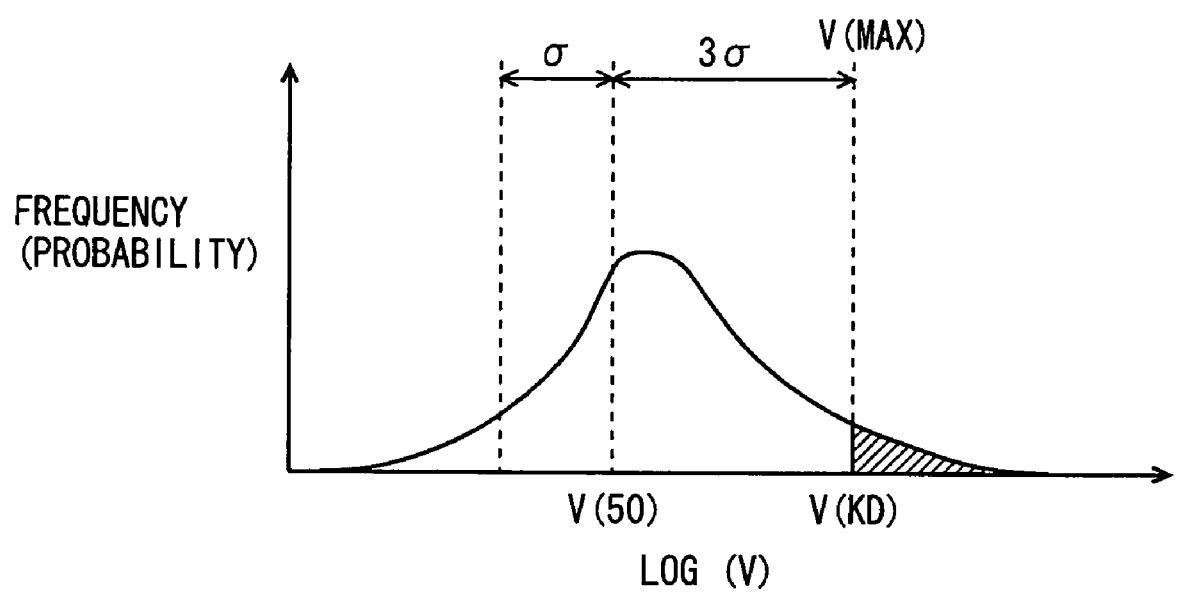

KNOCKING STATE DETERMINATION DEVICE

This nonprovisional application is based on Japanese Patent Application No. 2005-188618 filed with the Japan Patent Office on Jun. 28, 2005, the entire contents of which are hereby incorporated by reference.

BACKGROUND OF THE INVENTION

1. Field of the Invention

The present invention relates to a technique for determining a knocking state, and in particular, relates to a technique in which intensity values relating to the intensity of vibration of an internal combustion engine are detected, and based on the intensity values larger than a desired value, a knocking state is determined.

2. Description of the Background Art

In general, a knock determination level is set by multiplying an average value of knock sensor signals with a constant K. Such a KCS (Knock Control System) involves a problem that an optimum K value changes depending on manufacturing variations or temporal changes of engines, knock sensors or the like, whereby knock detection will not be able to be performed accurately. In order to solve this problem, there is a technique for determining presence or absence of knock based on the distribution profile of knock sensor signals.

A knock controlling device for an internal combustion engine described in the publication of Japanese Patent Laying-Open No. 01-315649 includes: a knock sensor for detecting knock in the internal combustion engine; a knock intensity value detector for detecting knock intensity values V effective for knock detection from signals of the knock sensor; a knock determiner for determining presence or absence of knock by comparing knock intensity values with a knock determination level; a knock controller for controlling knock control factors such as ignition timing or air fuel ratio based on the determination result; a cumulative % point detector for detecting cumulative % point VP of distribution of almost logarithmically converted values of knock intensity values V each time knock intensity value V is inputted; a standard deviation detector for detecting an actual standard deviation value S of almost logarithmically converted values of the knock intensity values each time knock intensity value V is inputted; and a knock determination level setting unit for setting a knock determination level VKD by VKD=S''×VP (where $n \geq 2.5$) based on cumulative % point VP and actual standard deviation values S. Among detected knock intensity values V, those higher than knock determination level VKD are determined as knock intensity values V caused by knocking. That is, the number (frequency) of knock intensity values higher than knock determination level VKD are determined as the number of times (frequency) that knocking has occurred.

According to the knock controlling device described in this publication, cumulative % point VP of distribution of almost logarithmically converted values of knock intensity values V detected by the knock intensity value detector is detected by the cumulative % point detector each time knock intensity value V is inputted, and the actual standard deviation value of the almost logarithmically converted values of knock intensity values V is detected each time knock intensity value V is inputted. Then, based on cumulative % point VP and the actual standard deviation value, the knock determination level is set by VKD=S''×VP by the knock determination level setting unit, and the knock determination level and knock intensity values are compared by the knock determiner, whereby presence or absence of knock is determined.

However, in the knock controlling device for an internal combustion engine described in the publication of Japanese Patent Laying-Open No. 01-315649, if a large number of knock intensity values V are detected due to knocking being caused frequently or BGL (Back Ground Level) of the internal combustion engine itself being increased, cumulative % point VP of distribution of almost logarithmic conversion values of knock intensity values V and the actual standard deviation values become larger. In such a case, knock determination level VKD becomes high. Because of it, knocking is not determined as having occurred even though knocking has occurred. Therefore, there is a problem that a knocking occurrence state cannot be determined with high accuracy, including the number of times that knocking has occurred.

SUMMARY OF THE INVENTION

It is an object of the present invention to provide a knocking state determination device capable of determining a knocking occurrence state with high accuracy.

A knocking state determination device according to an aspect of the present invention determines a state of knocking in an internal combustion engine. This knocking state determination device includes: a detector for detecting a plurality of intensity values relating to the intensity of vibration caused in the internal combustion engine; a calculator for calculating a second value based on intensity values not more than a first value, among the plurality of intensity values; a corrector for correcting the first value such that a deviation between the first value and the second value becomes smaller than a predetermined deviation when the deviation between the first value and the second value is larger than the predetermined deviation; and a determiner for determining a knocking occurrence state based on intensity values larger than at least one of the corrected first value and a second value calculated based on intensity values not more than the corrected first value.

According to the present invention, the detector detects a plurality of intensity values relating to the intensity of vibration caused in the internal combustion engine. Based on intensity values not more than the first value among the plurality of intensity values, the calculator calculates the second value. For example, the median of the intensity values not more than the first value and the standard deviation value from the minimum value of the intensity values to the intensity values not more than the first value are calculated. By adding a product of a predetermined coefficient and the standard deviation value to the median, the second value is calculated. When the deviation between the second value calculated in this way and the first value is larger than a predetermined deviation, the first value is corrected such that the deviation between the first value and the second value becomes smaller than the predetermined deviation. The first value is, for example, decremented. At this time, the second value is also decremented corresponding to the correction of the first value. The determiner determines a knocking occurrence state based on intensity values larger than at least one value of the corrected first value and the second value calculated based on the intensity values not more than the corrected first value. For example, the number of intensity values larger than at least one value of the corrected first value and the second value calculated based on the intensity values not more than the corrected first value is determined as the number of times that knocking has occurred. Thereby, it is possible to determine a knocking occurrence state by using at least one of the second value smaller than the case of calculating the second value based on all of the plurality of intensity values and the first value having a smaller deviation with the second value, as a threshold. Therefore, in the case where a large number of large intensity values are detected, it is possible to prevent the number of times that knocking has occurred from becoming smaller than the actual number of occurrences due to the threshold for determining presence or absence of knocking becoming high. Consequently, it is possible to provide a knocking state determination device capable of determining a knocking occurrence state with high accuracy.

Preferably, the determiner includes a number determiner which determines the number of intensity values larger than at least one value of the corrected first value and the second value calculated based on the intensity values not more than the corrected first value, as the number of times that knocking has occurred.

According to the present invention, the number of intensity values larger than at least one of the corrected first value and the second value calculated based on the intensity values not more than the corrected first value is determined as the number of times that knocking has occurred. Therefore, in the case where a large number of large intensity values are detected, it is possible to prevent the number of times that knocking has occurred from becoming smaller than the actual number of occurrences due to a threshold for determining presence or absence of knocking becoming high. Consequently, it is possible to determine a knocking occurrence state with high accuracy.

More preferably, the knocking state determination device further includes: a median calculator for calculating the median of intensity values not more than the first value; and a standard deviation value calculator for calculating the standard deviation value from the minimum value of the intensity values to the intensity values not more than the first value. The calculator calculates the second value by adding a product of a predetermined coefficient and the standard deviation value to the median.

According to the present invention, the second value is calculated by adding a product of the standard deviation from the minimum value of the intensity values to the intensity values not more than the first value and a coefficient, to the median. Thereby, it is possible to calculate the second value to be used for determining a knocking occurrence state.

More preferably, the corrector corrects the first value to be decremented.

According to the present invention, the corrector decrements the first value. The second value is calculated from frequency distribution of intensity values, so when the first value is decremented so that the intensity values used for calculating the second value are decremented, the second value is decremented. Thereby, by decrementing the second value, it is possible to decrement a threshold which is to be used for determining presence or absence of knocking. Therefore, it is possible to prevent the detected number of times that knocking has occurred from becoming smaller than the actual number of occurrences due to a threshold for determining presence or absence of knocking becoming high.

More preferably, the knocking state determination device further includes an intensity detector for detecting the intensity of vibration caused by combustion of the internal combustion engine. The intensity value is a value that a peak value of the intensity of vibration of the internal combustion engine in a predetermined crank angle is logarithmically converted.

According to the present invention, a value that a peak value of the intensity of vibration is logarithmically converted is used as an intensity value. Thereby, it is possible to obtain intensity values appropriate for analyzing the magnitude of vibration by a knock sensor provided to a cylinder block for example.

More preferably, the knocking state determination device further includes: an intensity detector for detecting the intensity of vibration caused by combustion of the internal combustion engine; a storage for previously storing a waveform of vibration of the internal combustion engine in a predetermined crank angle; a waveform detector for detecting a waveform of vibration of the internal combustion engine in a predetermined crank angle; and a deviation calculator for calculating a value relating to a deviation between a stored waveform and a detected waveform, based on the result of comparing the stored waveform with the detected waveform. An intensity value is a value that a product of a peak value of the intensity of vibration of the internal combustion engine in a predetermined crank angle and a value relating to the deviation is logarithmically converted.

According to the present invention, a waveform of vibration of the internal combustion engine is detected. This waveform is, for example, compared with a waveform previously stored as a waveform when knocking occurs. Through comparison, a value relating to the deviation between the detected waveform and the stored waveform is calculated. Thereby, it is possible to compare whether the detected waveform is caused due to knocking from the waveform (behavior) of vibration, and to quantify it. As for an intensity value, a value that a product of a peak value of the intensity and a value relating to the deviation is logarithmically converted is used. Thereby, it is possible to obtain an intensity value considering a waveform (behavior) of vibration in addition to the magnitude of vibration. Therefore, the detected intensity of vibration can be analyzed multilaterally.

More preferably, the knocking state determination device further includes an intensity detector for detecting the intensity of vibration of an in-cylinder pressure of the internal combustion engine. An intensity value is a value that a peak value of the intensity of vibration of the in-cylinder pressure in a predetermined crank angle is logarithmically converted.

According to the present invention, a value that a peak value of the intensity of vibration of the in-cylinder pressure is logarithmically converted is used as an intensity value. Thereby, it is possible to obtain intensity values appropriate for analyzing the magnitude of vibration by an in-cylinder pressure sensor provided in a cylinder for example.

A knocking state determination device according to another aspect of the present invention determines a knocking state in an internal combustion engine. This knocking state determination device includes: a detector for detecting a plurality of intensity values relating to the intensity of vibration caused in the internal combustion engine; a calculator for calculating a second value based on intensity values not more than a first value, among the plurality of intensity values; a corrector for correcting the first value such that the first value becomes not less than the second value when the first value is smaller than the second value, and the first value becomes not more than the second value when the first value is larger than the second value; and a determiner for determining a knocking occurrence state based on intensity values larger than at least one of the corrected first value and a second value calculated based on the intensity values not more than the corrected first value.

According to the present invention, the detector detects a plurality of intensity values relating to the intensity of vibration caused in the internal combustion engine. Based on intensity values not more than a first value among the plurality of intensity values, the calculator calculates a second value. For example, the median of the intensity values not more than the first value and the standard deviation value from the minimum value of the intensity values to the intensity values not more than the first value are calculated. By adding a product of a predetermined coefficient and the standard deviation value to the median, the second value is calculated. By comparing the second value calculated in this way with the first value, the first value is corrected such that the first value becomes not less than the second value when the first value is smaller than the second value, and the first value becomes not more than the second value when the first value is larger than the second value. The first value is, for example, decremented. At this time, the second value is decremented corresponding to the correction of the first value. The determiner determines a knocking occurrence state based on intensity values larger than at least one value of the corrected first value and the second value calculated based on the intensity values not more than the corrected first value. For example, the number of intensity values larger than at least one value of the corrected first value and the second value calculated based on the intensity values not more than the corrected first value is determined as the number of times that knocking has occurred. Thereby, it is possible to determine a knocking occurrence state by using at least one of the second value smaller than the case of calculating the second value based on all of the plurality of intensity values and the first value having a smaller deviation with the second value, as a threshold. Therefore, in the case where a large number of large intensity values are detected, it is possible to prevent the number of times that knocking is determined to have occurred from becoming smaller than the actual number of occurrences due to a threshold for determining presence or absence of knocking becoming high. Consequently, it is possible to provide a knocking state determination device capable of determining a knocking occurrence state with high accuracy.

Preferably, the determiner includes a number determiner which determines the number of intensity values larger than at least one value of the corrected first value and the second value calculated based on the intensity values not more than the corrected first value, as the number of times that knocking has occurred.

According to the present invention, the number of intensity values larger than at least one of the corrected first value and the second value calculated based on the intensity values not more than the corrected first value is determined as the number of times that knocking has occurred. Thereby, by using at least one of the second value smaller than the case where the second value is calculated based on all of the plurality of intensity values and the first value having a smaller deviation with the second value as a threshold, it is possible to determine the number of times that knocking has occurred. Therefore, in the case where a large number of large intensity values are detected, it is possible to prevent the number of times that knocking is determined to have occurred from becoming smaller than the actual number of occurrences due to the threshold for determining presence or absence of knocking becoming high. Consequently, it is possible to determine a knocking occurrence state with high accuracy.

More preferably, the knocking state determination device further includes: a median calculator for calculating the median of intensity values not more than the first value; and a standard deviation value calculator for calculating the standard deviation value from the minimum value of the intensity values to intensity values not more than the first value. The calculator calculates the second value by adding a product of a predetermined coefficient and the standard deviation value to the median.

According to the present invention, the second value is calculated by adding a product of the standard deviation from the minimum value of the intensity values to the intensity values not more than the first value and a coefficient, to the median. Thereby, it is possible to calculate the second value which is to be used for determining a knocking occurrence state from frequency distribution of the intensity values.

More preferably, the corrector corrects the first value to be decremented.

According to the present invention, the corrector decrements the first value. The second value is calculated from frequency distribution of intensity values, so when the first value is decremented so that the intensity values used for calculating the second value are decremented, the second value is decremented. Thereby, by decrementing the second value, it is possible to decrement the threshold which is to be used for determining presence or absence of knocking. Therefore, so it is possible to prevent the number of times that knocking is determined to have occurred from becoming smaller than the actual number of occurrences due to the threshold for determining presence or absence of knocking becoming high.

More preferably, the knocking state determination device further includes an intensity detector for detecting the intensity of vibration caused by combustion of the internal combustion engine. An intensity value is a value that a peak value of the intensity of vibration of the internal combustion engine in a predetermined crank angle is logarithmically converted.

According to the present invention, a value that a peak value of the intensity of vibration is logarithmically converted is used as an intensity value. Thereby, it is possible to obtain intensity values appropriate for analyzing the magnitude of vibration by a knock sensor provided to a cylinder block for example.

More preferably, the knocking state determination device further includes: an intensity detector for detecting the intensity of vibration caused by combustion of the internal combustion engine; a storage for previously storing a waveform of vibration of the internal combustion engine in a predetermined crank angle; a waveform detector for detecting a waveform of vibration of the internal combustion engine in a predetermined crank angle; and a deviation calculator for calculating a value relating to the deviation between a stored waveform and a detected waveform, based on the result of comparing the stored waveform with the detected waveform. An intensity value is a value in which a product of a peak value of the intensity of vibration of the internal combustion engine in a predetermined crank angle and a value relating to the deviation is logarithmically converted.

According to the present invention, a waveform of vibration of the internal combustion engine is detected. This waveform is, for example, compared with a waveform previously stored as a waveform when knocking occurs. Through comparison, a value relating to the deviation between the detected waveform and the stored waveform is calculated. Thereby, it is possible to compare whether the detected waveform is caused due to knocking from the waveform (behavior) of vibration, and to quantify it. As for an intensity value, a value that a product of a peak value of the intensity and a value relating to the deviation is used. Thereby, it is possible to obtain an intensity value considering a waveform (behavior) of vibration in addition to the magnitude of vibration. Therefore, the detected intensity of vibration can be analyzed multilaterally.

More preferably, the knocking state determination device further includes an intensity detector for detecting the intensity of vibration of an in-cylinder pressure of the internal combustion engine. An intensity value is a value that a peak value of the intensity of vibration of the in-cylinder pressure in a predetermined crank angle is logarithmically converted.

According to the present invention, a value that a peak value of the intensity of vibration of the in-cylinder pressure is logarithmically converted is used as an intensity value. Thereby, it is possible to obtain intensity values appropriate for analyzing the magnitude of vibration by an in-cylinder pressure sensor provided to a cylinder for example.

A knocking state determination device according to still another aspect of the present invention determines a knocking state in an internal combustion engine. This knocking state determination device includes: a detector for detecting a plurality of intensity values relating to the intensity of vibration caused in the internal combustion engine; a calculator for calculating a knock determination level by calculating the standard deviation value and the median of at least a part of the plurality of intensity values, and adding a product of a predetermined coefficient and the standard deviation to the median; a remover for repeatedly removing maximum values from the intensity values used for calculating the knock determination level such that a deviation between the maximum value of the intensity values used for calculating the knock determination level and the knock determination level becomes smaller when the deviation between the maximum value of the intensity values used for calculating the knock determination level and the knock determination level is larger than a predetermined deviation, whereby reducing the intensity values used for calculating the knock determination level; and a determiner for determining a knocking occurrence state based on intensity values larger than at least one of the maximum value of the intensity values used for calculating the knock determination level and the knock determination level.

According to the present invention, the detector detects a plurality of intensity values relating to the intensity of vibration caused in the internal combustion engine. Then, the standard deviation value and the median of at least a part of the plurality of intensity values are calculated, and a product of a predetermined coefficient and the standard deviation value is added to the median, whereby a knock determination level is calculated. When the deviation between the knock determination level calculated in this way and the maximum value of the intensity values used for calculating the knock determination level is larger than a predetermined level, maximum values are removed repeatedly from the intensity values used for calculating the knock determination level such that the deviation between the maximum value of the intensity values used for calculating the knock determination level and the knock determination level becomes smaller than the predetermined deviation. Thereby, the intensity values used for calculating the knock determination level are reduced. Corresponding to this, the median and the standard deviation are decremented, so the knock determination level is decremented. The determiner determines a knocking occurrence state based on intensity values larger than at least one value of the maximum value of selected intensity values and the knock determination level. For example, it is determined that the number of intensity values larger than at least one value of the maximum value of the selected intensity values and the knock determination level as the number of times that knocking has occurred. Thereby, it is possible to determine a knocking occurrence state by using at least one of a knock determination level smaller than the case of calculating a knock determination level based on all of the plurality of intensity values and a maximum value having a smaller deviation with the knock determination level, as a threshold. Therefore, in the case where a large number of large intensity values are detected, it is possible to prevent the number of times that knocking is determined to have occurred from becoming smaller than the actual number of occurrences due to a threshold for determining presence or absence of knocking becoming high. Consequently, it is possible to provide a knocking state determination device capable of determining a knocking occurrence state with high accuracy.

Preferably, the knocking state determination device is, the determiner includes a number determiner which determines the number of intensity values larger than at least one value of the maximum value in the intensity values used for calculating the knock determination level and the knock determination level as the number of times that knocking is determined to have occurred.

According to the present invention, the number of intensity values larger than at least one value of the maximum value of the intensity values used for calculating the knock determination level and the knock determination level is determined as the number of times that knocking has occurred. Thereby, it is possible to determine the number of times that knocking has occurred by using at least one of a knock determination level smaller than the case of calculating a knock determination level based on all of the plurality of intensity values and a maximum value having smaller deviation with the knock determination level, as a threshold. Therefore, in the case where a large number of large intensity values are detected, it is possible to prevent the number of times that knocking is determined to have occurred from becoming smaller than the actual number of occurrences due to the threshold for determining presence or absence of knocking becoming high. Consequently, it is possible to determine the number of times that knocking has occurred with high accuracy.

More preferably, the knocking state determination device further includes an intensity detector for detecting the intensity of vibration caused by combustion of the internal combustion engine. An intensity value is a value in which a peak value of the intensity of vibration of the internal combustion engine in a predetermined crank angle is logarithmically converted.

According to the present invention, as an intensity value, a value in which a peak value of the intensity of vibration is logarithmically converted. Thereby, by a knock sensor provided to a cylinder block, it is possible to obtain intensity values appropriate for analyzing the magnitude of vibration.

More preferably, the knocking state determination device further includes: an intensity detector for detecting the intensity of vibration caused by combustion of the internal combustion engine; a storage for previously storing a waveform of vibration of the internal combustion engine in a predetermined crank angle; a waveform detector for detecting a waveform of vibration of the internal combustion engine in a predetermined crank angle; and a deviation calculator for calculating a value relating to the deviation between a stored waveform and a detected waveform, based on the result of comparing the stored waveform with the detected waveform. The intensity value is a value that a product of a peak value of the intensity of vibration of the internal combustion engine in a predetermined crank angle and a value relating to the deviation is logarithmically converted.

According to the present invention, a waveform of vibration of the internal combustion engine is detected. This waveform is, for example, compared with the waveform previously stored as a waveform when knocking occurs. Through comparison, a value relating to the deviation between the detected waveform and the stored waveform is calculated. Thereby, it is possible to compare the detected vibration from the waveform (behavior) of vibration whether the detected vibration is caused due to knocking, and to digitize it. As an intensity value, a value that a product of a peak value of the intensity and a value relating to the deviation is logarithmically converted is used. Thereby, an intensity value can be obtained while considering the waveform (behavior) of vibration in addition to the magnitude of vibration. Therefore, it is possible to analyze the intensity of vibration detected multilaterally.

More preferably, the knocking state determination device further includes an intensity detector for detecting the intensity of vibration of an in-cylinder pressure of the internal combustion engine. An intensity value is a value that a peak value of the intensity of vibration of the in-cylinder pressure in a predetermined crank angle is logarithmically converted.

According to the present invention, as an intensity value, a value in which a peak value of the intensity of vibration of the in-cylinder pressure is used. Thereby, it is possible to obtain intensity values appropriate for analyzing the magnitude of vibration by an in-cylinder pressure sensor provided in a cylinder for example.

A knocking state determination device according to still another aspect of the present invention determines a knocking state in an internal combustion engine. This knocking state determination device includes: a detector for detecting a plurality of intensity values relating to the intensity of vibration caused in the internal combustion engine; a calculator for calculating a knock determination level by calculating the standard deviation value and the median of at least a part of the plurality of intensity values, and adding a product of a predetermined coefficient and the standard deviation to the median; a remover for repeatedly removing maximum values from intensity values used for calculating the knock determination level such that the maximum value of the intensity values used for calculating the knock determination level becomes not less than the knock determination level when the maximum value of the intensity values used for calculating the knock determination level is smaller than the knock determination level, and the maximum value of intensity values used for calculating the knock determination level becomes not more than the knock determination level when the maximum value of the intensity values used for calculating the knock determination level is larger than the knock determination level, whereby reducing the intensity values used for calculating the knock determination level; and a determiner for determining a knocking occurrence state based on intensity values larger than at least one value of the maximum value of the intensity values used for calculating the knock determination level and the knock determination level.

According to the present invention, the detector detects a plurality of intensity values relating to the intensity of vibration caused in the internal combustion engine. The standard deviation value and the median of at least a part of the plurality of intensity values are calculated, and a product of a predetermined coefficient and the standard deviation is added to the median, whereby a knock determination level is calculated. The knock determination level calculated in this way and the maximum value of the selected intensity values are compared. When the maximum value of the intensity values used for calculating the knock determination level is smaller than the knock determination level, maximum values are removed repeatedly from the intensity values used for calculating the knock determination level such that the maximum value becomes not less than the knock determination level, whereby the intensity values used for calculating the knock determination level are reduced. When the maximum value of the intensity values used for calculating the knock determination level is larger than the knock determination level, maximum values are removed repeatedly from the intensity values used for calculating the knock determination level such that the maximum value of the intensity values used for calculating the knock determination level becomes not more than the knock determination level, whereby the intensity values used for calculating the knock determination level are reduced. Corresponding to this, the median and the standard deviation are decremented, whereby the knock determination level is decremented. The determiner determines a knocking occurrence state based on intensity values larger than at least one value of the maximum value of the selected intensity values and the knock determination level. For example, the number of intensity values larger than at least one value of the maximum value of the selected intensity values and the knock determination level is determined as the number of times that knocking has occurred. Thereby, it is possible to determine a knocking occurrence state by using at least one of a knock determination level smaller than the case of calculating a knock determination level based on all of the plurality of intensity values and a maximum value having a smaller deviation with the knock determination level, as a threshold. Therefore, in the case where a large number of large intensity values are detected, it is possible to prevent the number of times that knocking is determined to have occurred from becoming smaller than the actual number of occurrences due to the threshold for determining presence or absence of knocking becoming high. Consequently, it is possible to provide a knocking state determination device capable of determining a knocking occurrence state with high accuracy.

Preferably, the knocking state determination device is, the determiner includes a number determiner which determines the number of intensity values larger than at least one value of the maximum value in the intensity values used for calculating the knock determination level and the knock determination level, as the number of times that knocking has occurred.

According to the present invention, the number of intensity values larger than at least one value of the maximum value of the intensity values used for calculating the knock determination level and the knock determination level is determined as the number of times that knocking has occurred. Thereby, it is possible to determine the number of times that knocking has occurred by using at least one of a knock determination level smaller than the case of calculating a knock determination level based on all of the plurality of intensity values and a maximum value having smaller deviation with the knock determination level, as a threshold. Therefore, in the case where a large number of large intensity values are detected, it is possible to prevent the number of times that knocking is determined to have occurred from becoming smaller than the actual number of occurrences due to the threshold for determining presence or absence of knocking becoming high. Consequently, it is possible to determine the number of times that knocking has occurred with high accuracy.

More preferably, the knocking state determination device further includes an intensity detector for detecting the intensity of vibration caused by combustion of the internal combustion engine. An intensity value is a value that a peak value of the intensity of vibration of the internal combustion engine in a predetermined crank angle is logarithmically converted.

According to the present invention, as an intensity value, a value in which a peak value of the intensity of vibration is logarithmically converted is used. Thereby, by a knock sensor provided to a cylinder block, it is possible to obtain an intensity value appropriate for analyzing the magnitude of vibration.

More preferably, the knocking state determination device further includes: an intensity detector for detecting the intensity of vibration caused by combustion of the internal combustion engine; a storage for previously storing a waveform of vibration of the internal combustion engine in a predetermined crank angle; a waveform detector for detecting a waveform of vibration of the internal combustion engine in a predetermined crank angle; and a deviation calculator for calculating a value relating to a deviation between a stored waveform and a detected waveform, based on the result of comparing the stored waveform with the detected waveform. An intensity value is a value that a product of a peak value of the intensity of vibration of the internal combustion engine in a predetermined crank angle and a value relating to the deviation is logarithmically converted.

According to the present invention, a waveform of vibration of the internal combustion engine is detected. This waveform is, for example, compared with the waveform previously stored as a waveform when knocking occurs. Through comparison, a value relating to a deviation between the detected waveform and the stored waveform is calculated. Thereby, it is possible to compare the detected vibration from the waveform (behavior) of vibration whether the detected vibration is caused due to knocking, and to digitize it. As an intensity value, a value that a product of a peak value of the intensity and a value relating to the deviation is logarithmically converted is used. Thereby, an intensity value can be obtained considering the waveform (behavior) of vibration in addition to the magnitude of vibration. Therefore, the detected intensity of vibration can be analyzed multilaterally.

More preferably, the knocking state determination device further includes an intensity detector for detecting the intensity of vibration of an in-cylinder pressure of the internal combustion engine. An intensity value is a value that a peak value of the intensity of vibration of the in-cylinder pressure in a predetermined crank angle is logarithmically converted.

According to the present invention, as an intensity value, a value that a peak value of the intensity of vibration of the in-cylinder pressure is used. Thereby, it is possible to obtain intensity values appropriate for analyzing the magnitude of vibration by an in-cylinder pressure sensor provided in a cylinder for example.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a chart showing frequency distribution of a state where a maximum value V(MAX) and a knock determination level V(KD) coincide.

DESCRIPTION OF THE PREFERRED EMBODIMENTS

Figure 1:
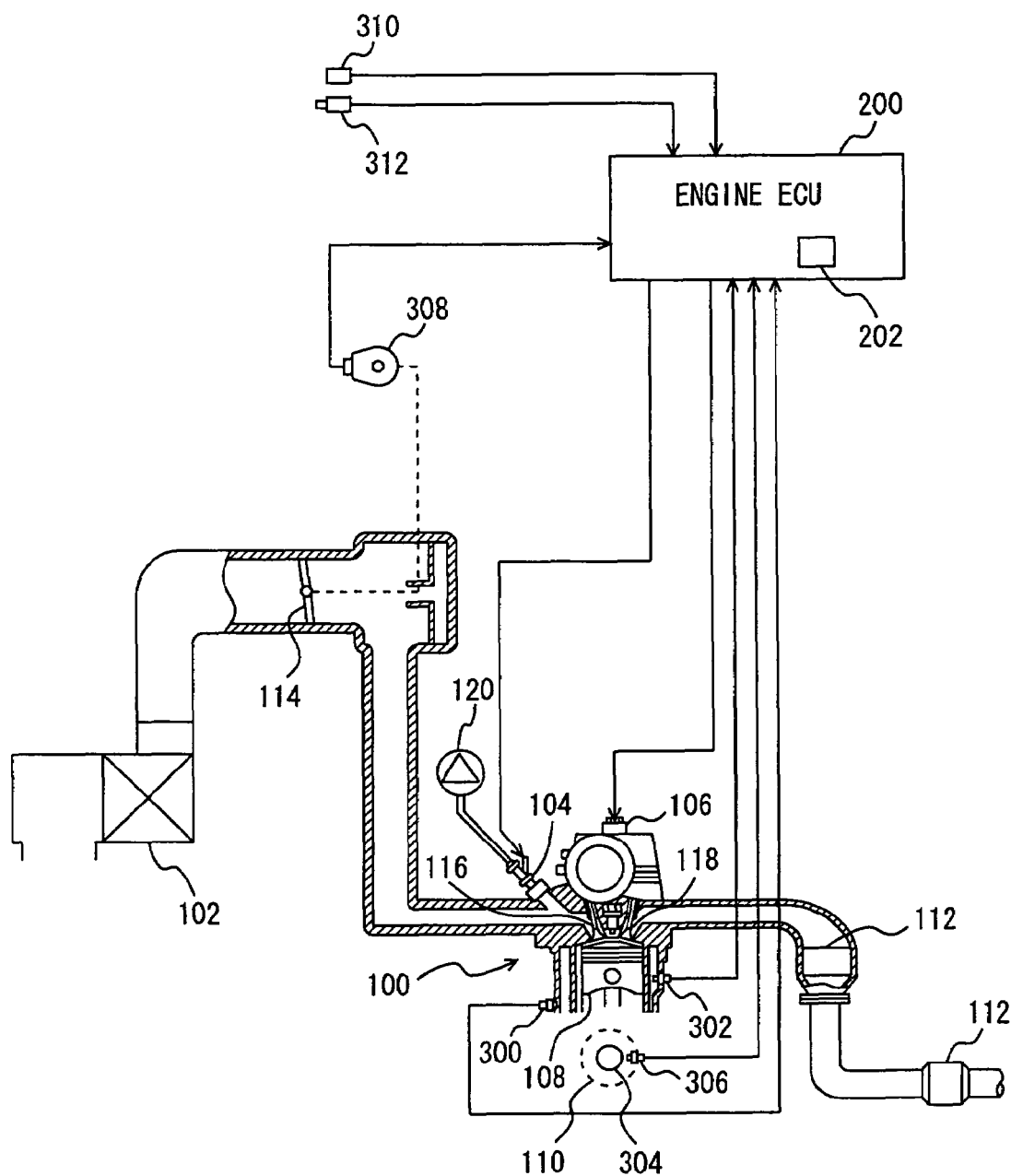
FIG. 1 is a schematic configuration diagram showing an engine controlled by an engine ECU which is a knocking occurrence number determination device according to an embodiment of the present invention.

Hereinafter, an embodiment of the present invention will be described with reference to the drawings. In the description below, same components are denoted by same reference numerals. Their names and functions are same. Therefore, detailed description thereof will not be repeated.

Referring to FIG. 1, an engine 100 of a vehicle mounting a knocking occurrence number determination device according to a first embodiment of the present invention will be described. The knocking occurrence number determination device according to the present embodiment is realized by, for example, a program executed by an engine ECU (Electronic Control Unit) 200.

Engine 100 is an internal combustion engine which ignites an air taken from an air cleaner 102 and an air-fuel mixture injected from an injector 104 with an ignition plug 106 in a combustion chamber and burns them.

When the air-fuel mixture is burnt, a piston 108 is pressed downward by a combustion pressure, and a crankshaft 110 rotates. The burnt air-fuel mixture (exhaust gas) is purified by a three way catalyst 112, and then discharged to the outside of the vehicle. The amount of air taken into engine 100 is regulated by a throttle valve 114.

Engine 100 is controlled by engine ECU 200. Engine ECU 200 is connected with a knock sensor 300, a water temperature sensor 302, a crank position sensor 306 provided opposite to a timing rotor 304, a throttle opening sensor 308, a vehicle speed sensor 310, and an ignition switch 312.

Knock sensor 300 consists of a piezoelectric element. Knock sensor 300 generates voltage by vibration of engine 100. The magnitude of voltage corresponds to the magnitude of vibration. Knock sensor 300 transmits signals indicating voltage to engine ECU 200. Water temperature sensor 302 detects temperature of cooling water inside a water jacket of engine 100, and transmits signals indicating the detection result to engine ECU 200.

Timing rotor 304 is provided to a crank shaft 110, and rotates together with crank shaft 110. On the outer periphery of timing rotor 304, a plurality of protrusions are provided at predetermined intervals. Crank position sensor 306 is provided opposite to the protrusions of timing rotor 304. When timing rotor 304 rotates, an air gap between the protrusions of timing rotor 304 and crank position sensor 306 changes, so a magnetic flux passing through a coil part of cramp position sensor 306 increases or decreases, whereby electromotive force is generated in the coil part. Cramk position sensor 306 transmits a signal indicating the electromotive force to engine ECU 200. Engine ECU 200 detects a crank angle based on the signal transmitted from crank position sensor 306.

Throttle opening sensor 308 detects throttle opening and transmits a signal indicating the detection result to engine ECU 200. Vehicle speed sensor 310 detects the number of rotations of a wheel (not shown), and transmits a signal indicating the detection result to engine ECU 200. Engine ECU 200 calculates the vehicle speed from the number of rotations of the wheel. Ignition switch 312 is operated to be turned on by a driver before starting engine 100.

Engine ECU 200 performs computation based on signals transmitted from each sensor and ignition switch 312 and a map and a program stored on a memory 202, and controls machinery so that engine 100 becomes to be in a desired operating state.

In the present embodiment, engine ECU 200 detects a waveform of vibration of engine 100 in a predetermined knock detection gate (a section from a predetermined first crank angle to a predetermined second crank angle) based on the signal and the crank angle transmitted from knock sensor 300, and based on the detected vibration waveform, determines whether knocking occurs in engine 100. The knock detection gate in the present embodiment is from a top dead center (0degree) to 90 degrees in the combustion process. Note that the knock detection gate is not limited to this.

Figure 2:
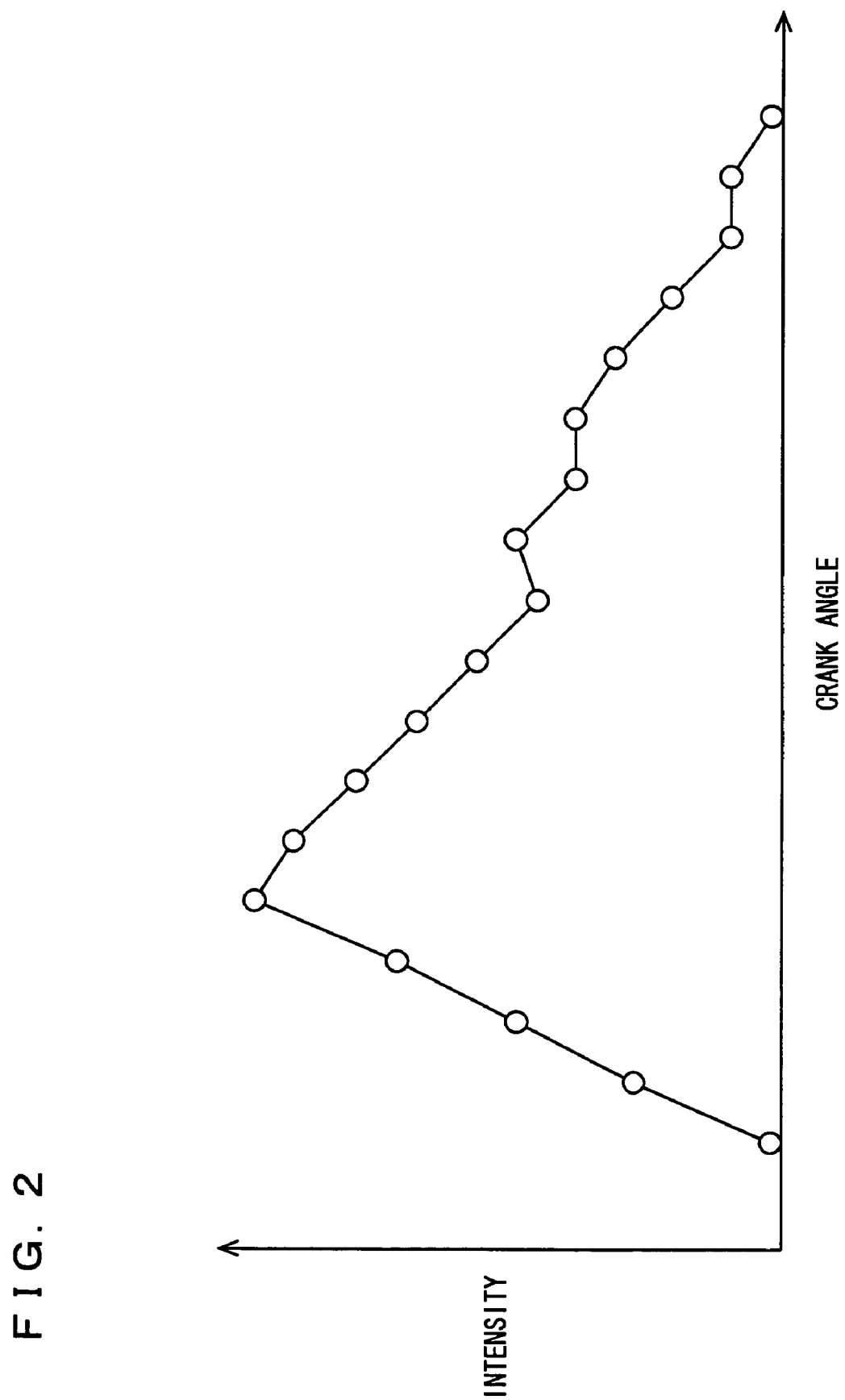
FIG. 2 is a chart showing a vibration waveform of the engine.

As shown in FIG. 2, a vibration waveform is indicated by a value in which an output voltage value (value indicating the intensity of vibration) of knock sensor 300 is integrated by 5 degrees (only for 5 degrees) at the crank angle. Note that the intensity of vibration may be indicated by a value corresponding to an output voltage value of knock sensor 300.

Figure 3:
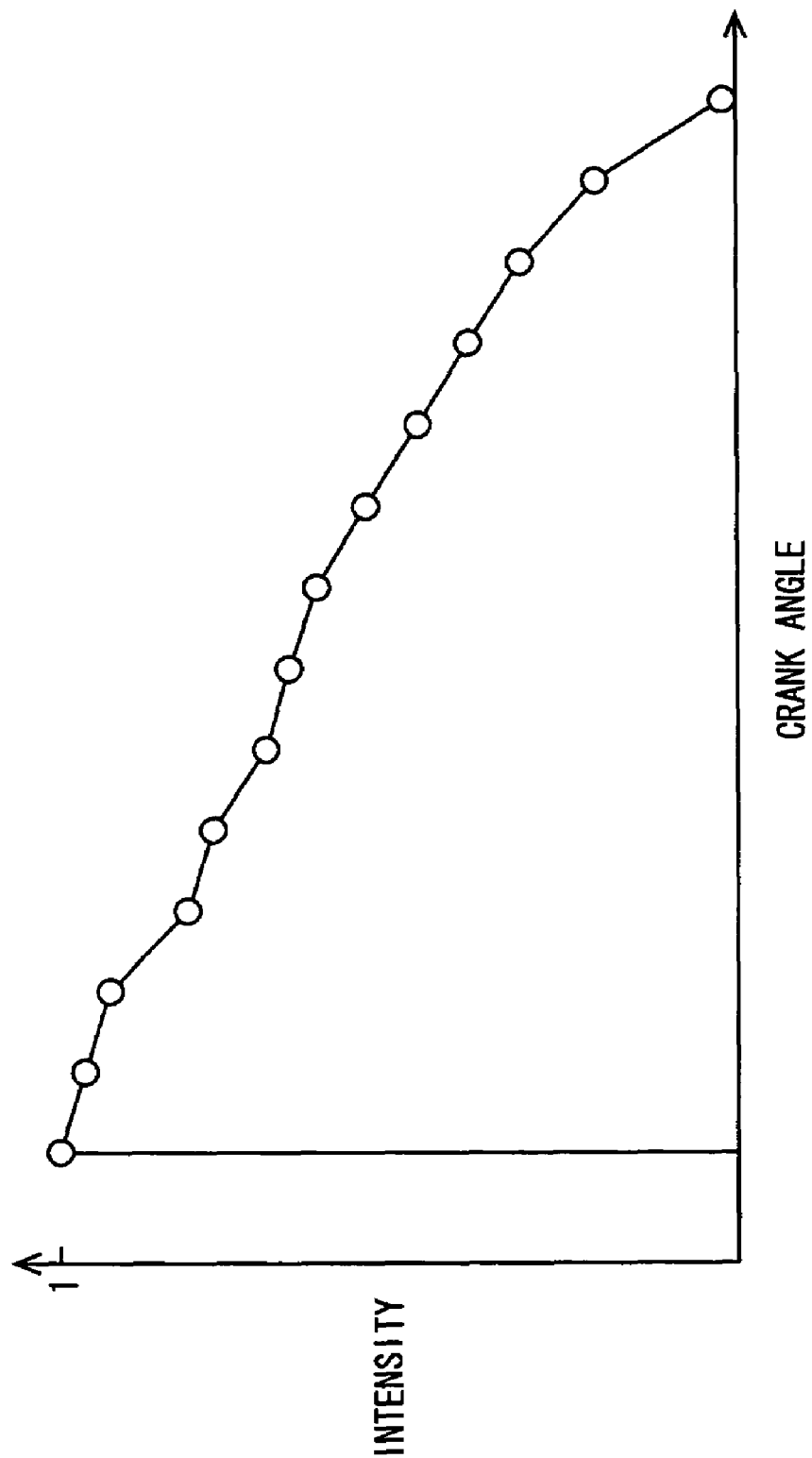
FIG. 3 is a chart showing a knock waveform model stored on a memory of the engine ECU.

The detected vibration waveform is compared with the knock waveform model stored on memory 202 of engine ECU 200 as shown in FIG. 3. The knock waveform model is previously created as a model of a vibration waveform of the case where knocking occurs in engine 100.

In the knock waveform model, the intensity of vibration is indicated as a dimensionless number of 0 to 1, and the intensity of vibration does not correspond to the crank angle unambiguously. That is, in the knock waveform model of the present embodiment, it is defined that the intensity of vibration decreases as the crank angle becomes larger after a peak value of the intensity of vibration, but a crank angle where the intensity of vibration shows a peak value is not defined.

The knock waveform model of the present embodiment corresponds to vibration after the peak value of the intensity of vibration caused by knocking. Note that a knock waveform model corresponding to vibration after rising of vibration due to knocking may be stored.

Through experimentations or the like, the knock waveform model detects a vibration waveform of engine 100 when forcibly causing knocking, and is created and stored previously based on the vibration waveform.

A knock waveform model is created by using engine 100 in which the dimension of engine 100 and an output value of knock sensor 300 are medians of dimensional tolerance and tolerance of output values of knock sensor 300 (hereinafter described as a characteristic center engine). That is, a knock waveform model is a vibration waveform when forcibly causing knocking in the characteristic center engine.

Note that a method of creating a knock waveform model is not limited to this, and it may be created by simulation.

Engine ECU 200 compares a detected waveform and a stored knock waveform model, and determines whether knocking has occurred in engine 100.

Figure 4:
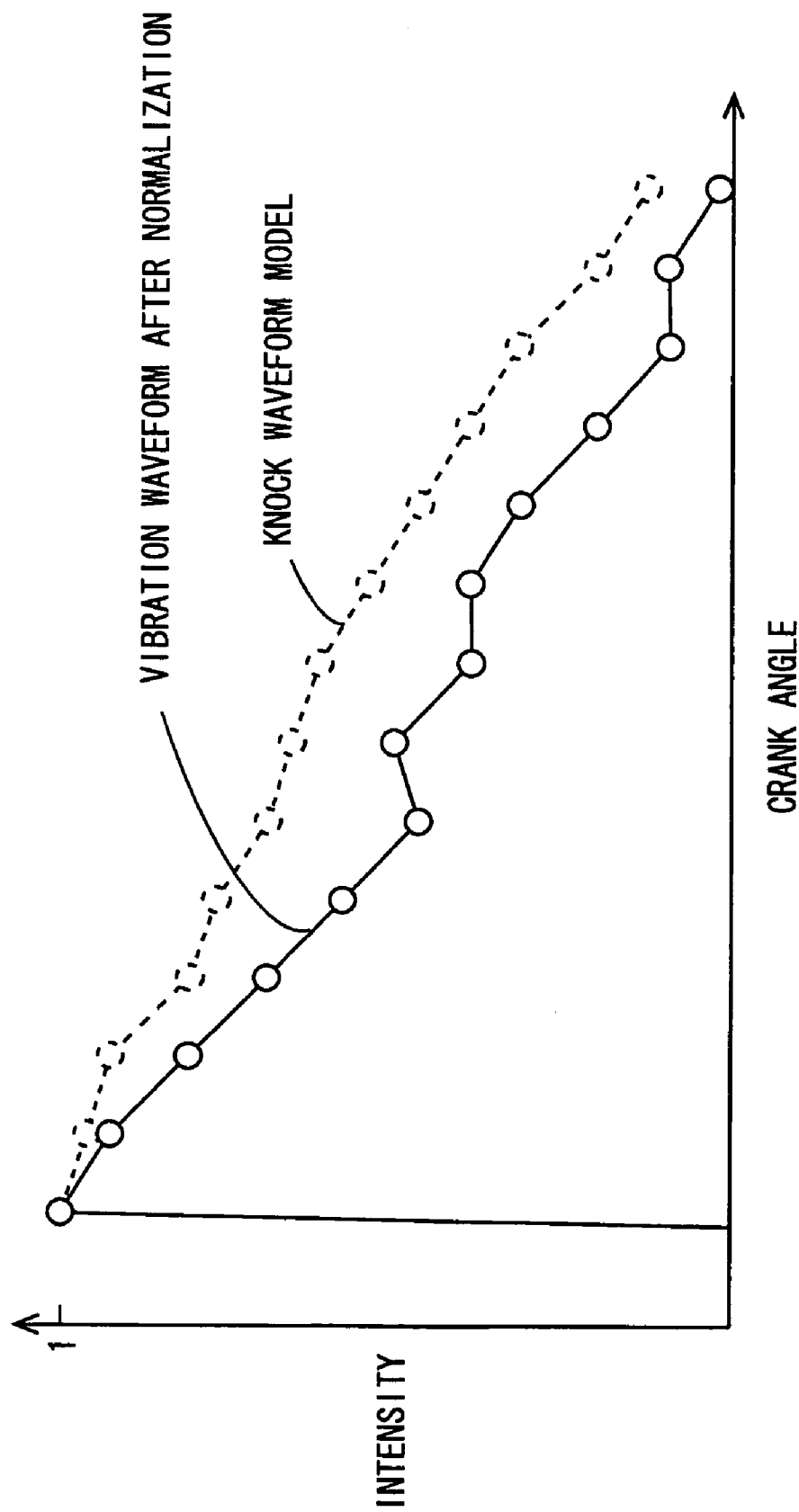
FIG. 4 is a chart showing a state of comparing a normalized vibration waveform and a knock waveform mode.
Figure 5:
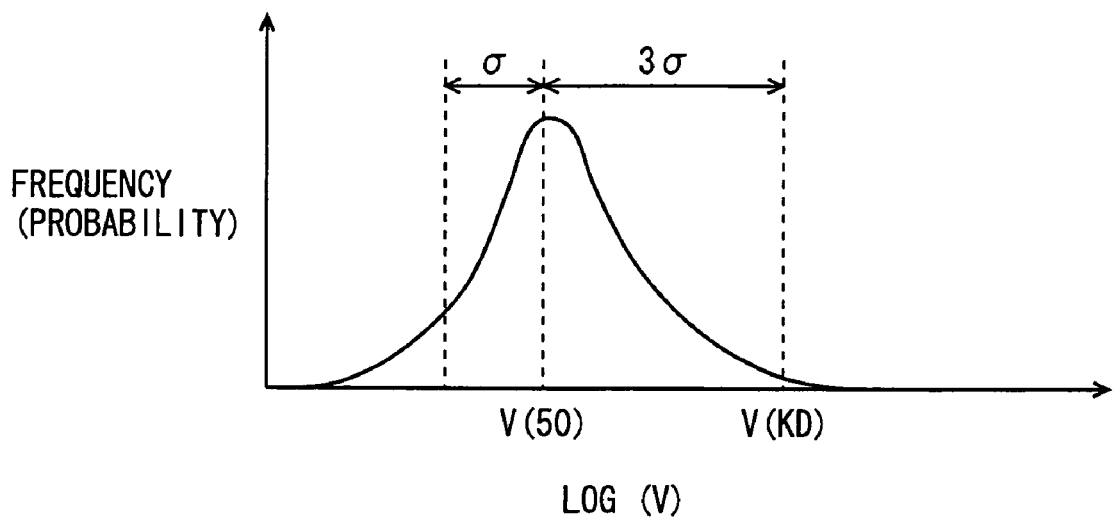
FIG. 5 is a chart showing frequency distribution of intensity values LOG(V).

In comparing the detected waveform and the knock waveform model, a normalized waveform and the knock waveform model are compared as shown in FIG. 4. Here, normalization means that the intensity of vibration is indicated as a dimensionless number of 0 to 1 by dividing by the maximum value of the integrated value in the detected vibration waveform by each integration value. Note that a normalization method is not limited to this.

In the present embodiment, engine ECU 200 calculates a correlation coefficient K which is a value relating to a deviation between a normalized waveform and a knock waveform model. In a state where timing at which the intensity of vibration in a vibration waveform after normalization and timing at which the intensity of vibration in a knock waveform model, an absolute value (shift amount) of the deviation between the vibration waveform after normalization and the knock waveform model is calculated by a crank angle (by 5 degrees), whereby the correlation coefficient K is calculated.

Assuming that an absolute value of a deviation between a vibration waveform after normalization and a knock waveform model by a crank angle is $\Delta S(I)$ (I is a natural number) and a value in which the intensity of vibration in the knock waveform model is integrated with the crank angle (area of the knock waveform model) is S, correlation coefficient K is calculated by an equation of $K=(S-\Sigma \Delta S(I))/S$. Here, $\Sigma \Delta S(I)$ is the total of $\Delta S(I)$. Note that a method of calculating correlation coefficient K is not limited to this.

Further, engine ECU 200 calculates a knock intensity N based on correlation coefficient K and the maximum value (peak value) of integrated values. Assuming that the maximum value of integrated values is P, and a value indicating vibration of engine 100 in a state where knocking has not occurred in engine 100 is BGL (Back Ground Level), knock intensity N is calculated by an equation of $N=P \times K/BGL$. BGL is stored on memory 202. Note that a method of calculating knock intensity N is not limited to this.

In the present embodiment, if calculated knock intensity N is larger than determination value V(KX), engine ECU 200 determines that knocking has occurred in engine 100, so it retards ignition timing. If knock intensity N is smaller than determination value V(KX), engine ECU 200 determines that knocking has not occurred in engine 100, so it advances igniting timing.

As an initial value of the determination value V(KX), a value previously defined through experimentations or the like is used. However, even in the case where same vibration is caused in engine 100 due to variation in output values of knock sensor 300 or deterioration, the intensity to be detected may fluctuate. In such a case, it is required to correct determination value V(VK) and to determine whether knocking has occurred by using a determination value V(KX) corresponding to the intensity to be detected actually.

Therefore, in the present embodiment, determination value V(KX) is corrected by using frequency distribution showing the relationship between intensity values LOG(V) which are values that intensities V for the predetermined number of ignition cycles (e.g., 200 cycles) are logarithmically converted and frequency that the intensity values LOG(V) are detected (may be called number of times or probability). Intensities V used for calculating intensity values LOG(V) are peak values of the intensities in a predetermined crank angle.

In the frequency distribution, a median V(50), in which frequency of intensity values LOG(V) are accumulated from the minimum value and becomes 50%, is calculated. Further, a standard deviation σ in the frequency distribution is calculated. A value in which a product of a coefficient U (U is a constant, e.g., U=3) and standard deviation σ is added to median V(50) becomes a knock determination level V(KD). Frequency of intensity values LOG(V) larger than knock determination level V(KD) is determined as frequency in which knocking has occurred.

Figure 6:
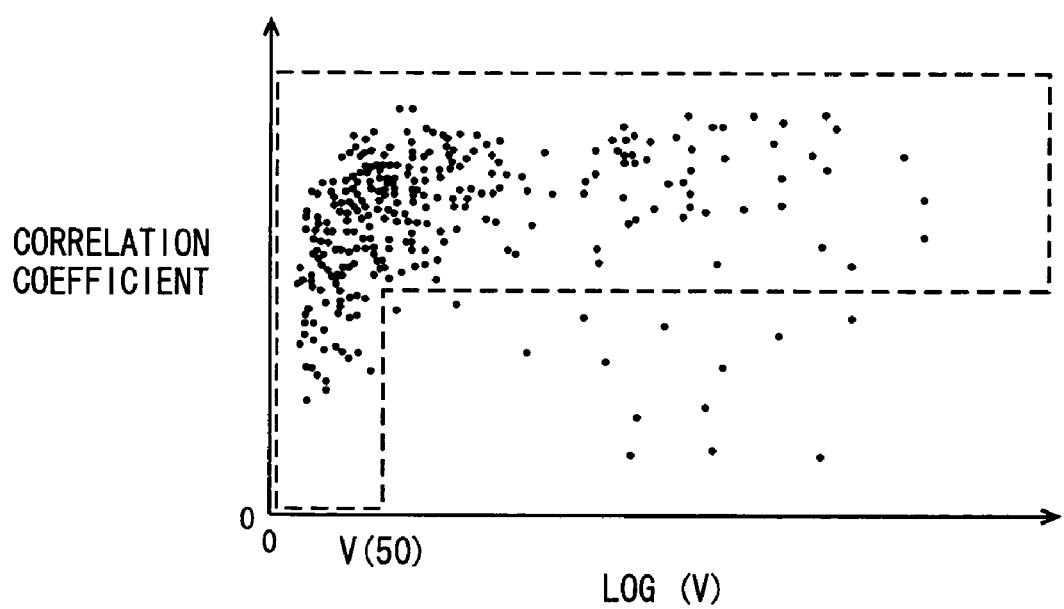
FIG. 6 is a chart showing intensity values LOG(V) used for preparing frequency distribution.

As for intensity values LOG(V) used for preparing frequency distribution, intensity values within an area enclosed by a broken line in FIG. 6 are used. FIG. 6 is a chart in which calculated intensity values LOG(V) are plotted by each correlation coefficient K in a cycle that intensity values LOG(V) are obtained.

Figure 7:
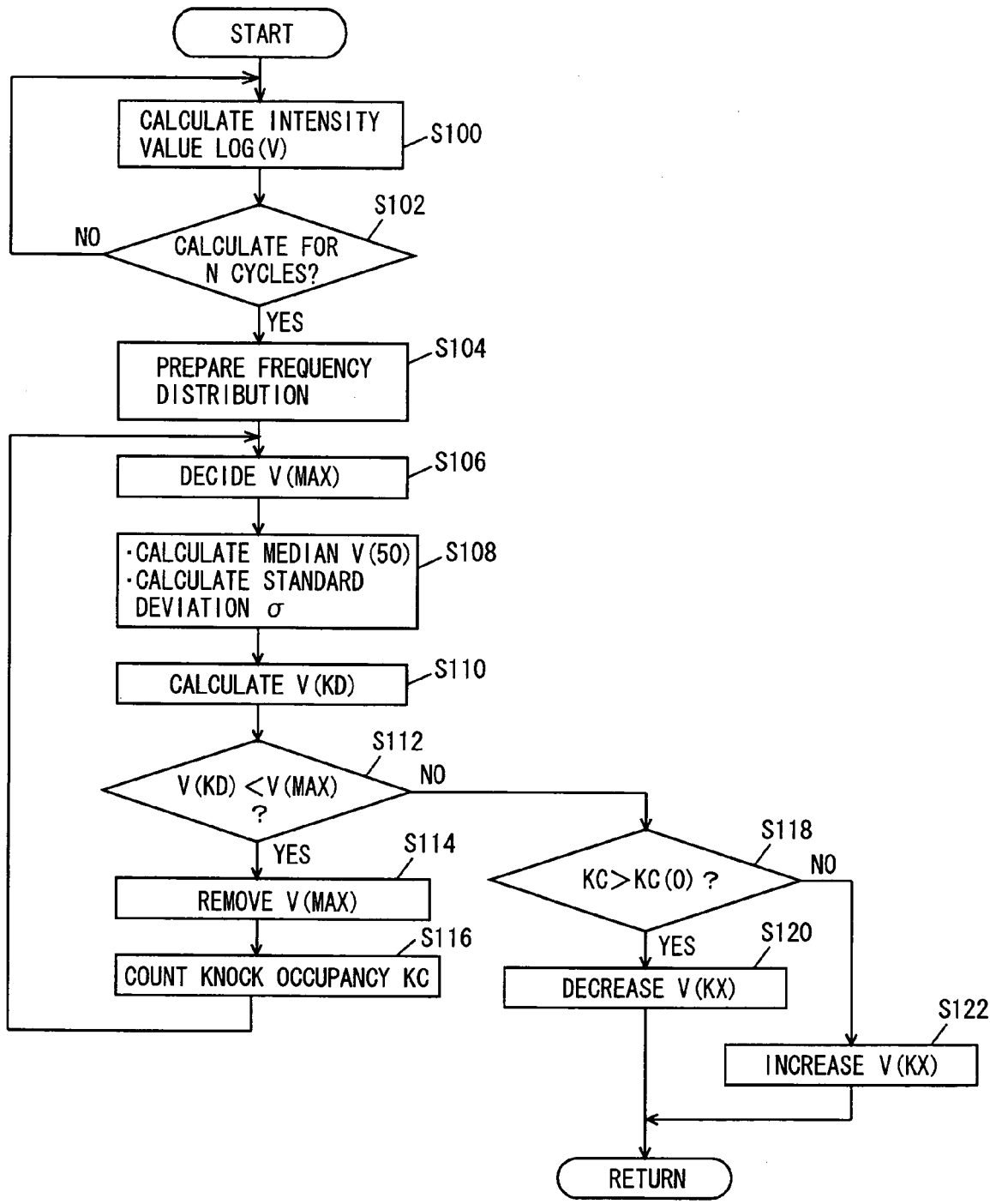
FIG. 7 is a flowchart showing the control structure of a program executed by the engine ECU of FIG. 1.

Referring to FIG. 7, the control structure of a program executed by engine ECU 200 of the knocking occurrence number determination device according to the present embodiment will be described.

In S100, engine ECU 200 calculates intensity value LOG (V) from intensity V detected based on a signal transmitted from knock sensor 300. Here, intensity V is a peak value in a predetermined crank angle.

In S102, engine ECU 200 determines whether intensity values LOG(V) for N (N is a natural number, e.g., N=200) cycles have been calculated. When engine ECU 200 calculates N or more pieces of intensity values LOG(V) within the area enclosed by the broken line in FIG. 6, it determines that intensity values LOG(V) for N cycles are calculated. When engine ECU 200 calculates intensity values LOG(V) for N cycles (YES in S102), the processing is moved to S104. If not (NO in S102), processing is returned to S100.

In S104, engine ECU 200 prepares frequency distribution of intensity values LOG(V). In S106, engine ECU 200 decides a maximum value V(MAX) of intensity values LOG (V).

In S108, engine ECU 200 calculates median V(50) and standard deviation σ of intensity values LOG(V) not more than maximum value V(MAX). In S110, engine ECU 200 calculates a knock determination level V(KD) based on median V(50) and standard deviation σ.

In S112, engine ECU 200 determines whether knock determination level V(KD) is smaller than maximum value V(MAX). If knock determination level V(KD) is smaller than maximum value V(MAX) (YES in S112), the processing is moved to S114. If not (NO in S112), the processing is moved to S118.

In S114, engine ECU 200 removes V(MAX) decided in S106 from the frequency distribution. In S116, engine ECU 200 counts the total frequency of removed maximum values V(MAX) as knock occupancy KC. Then, the processing is returned to S106.

In S118, engine ECU 200 determines whether the knock occupancy KC is larger than a threshold KC(0). If the knock occupancy KC is larger than the threshold KC(0) (YES in S118), the processing is moved to S120. If not (NO in S118), the processing is moved to S122. In S120, engine ECU 200 decrements determination value V(KX). In S122, engine ECU 200 increments determination value V(KX).

Description will be given for operation of engine ECU 200 of the knocking occurrence number determination device according to the present embodiment based on the structure and the flowchart described above.

When a driver operates ignition switch 312 to be turned on and engine 100 starts, intensity value LOG(V) is calculated from intensity V detected based on a signal transmitted from knock sensor 300 (S100).

When intensity values LOG(V) for N cycles are calculated (YES in S102), frequency distribution of calculated intensity values LOG(V) is prepared (S104), and maximum value V(MAX) of intensity values LOG(V) in the frequency distribution is decided (S106). Further, median V(50) and standard deviation σ in the frequency distribution of intensity values LOG(V) not more than the maximum value V(MAX) are calculated (S108), and based on median V(50) and standard deviation σ, knock determination level V(KD) is calculated (S110).

Figure 8:
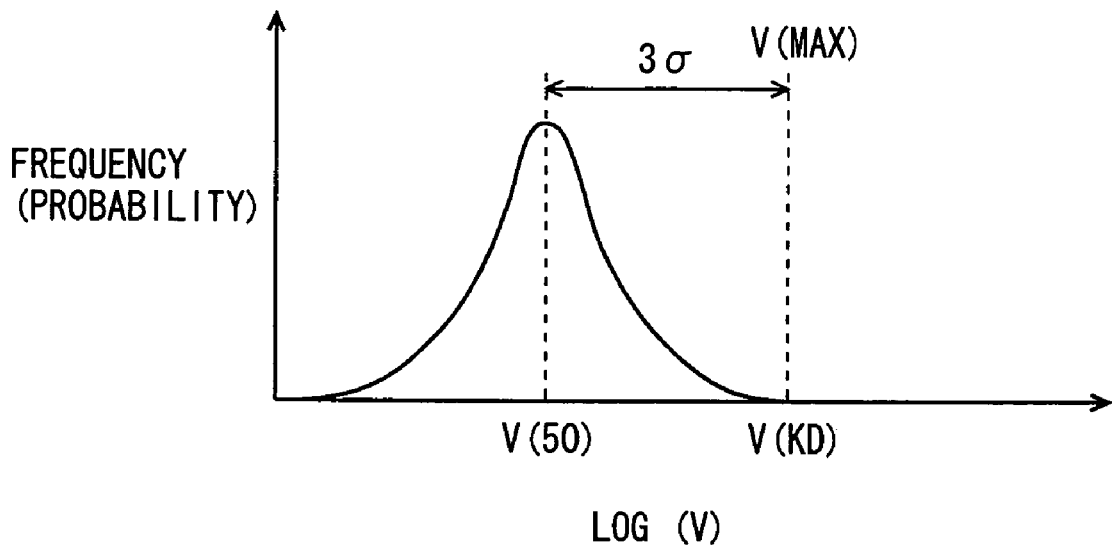
FIG. 8 is a chart showing frequency distribution of intensity values LOG(V) in a state where knocking has not occurred.
Figure 9:
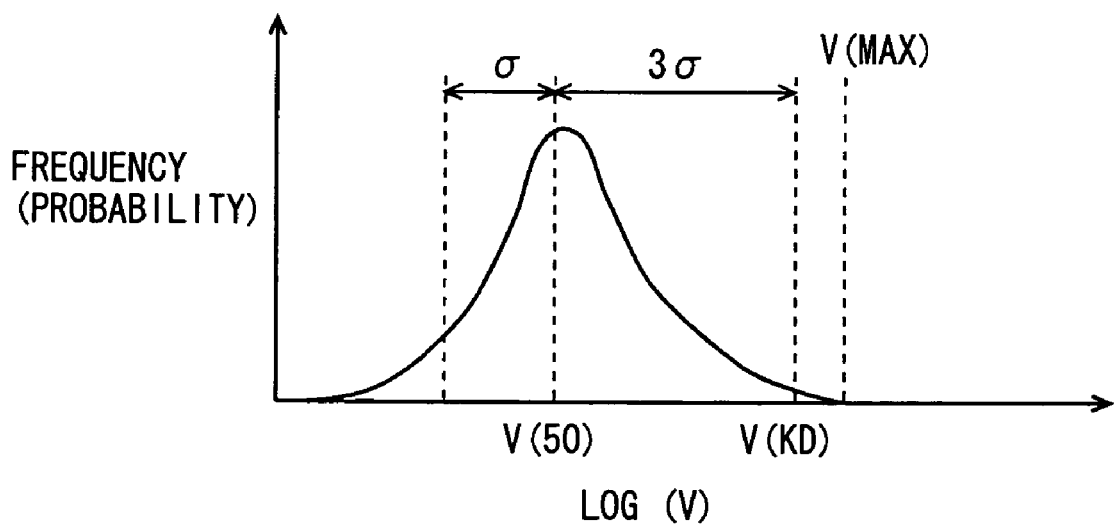
FIG. 9 is a chart showing frequency distribution of intensity values LOG(V) in a state where knocking has occurred (Ver. 1).

If knocking has not occurred in engine 100, the frequency distribution becomes a normal distribution as shown in FIG. 8, and maximum value V(MAX) and knock determination level V(KD) coincide. On the other hand, if knocking has occurred so that detected intensity V becomes larger and large intensity values LOG(V) are calculated, maximum value V(MAX) becomes larger than knock determination level V(KD) as shown in FIG. 9.

Figure 10:
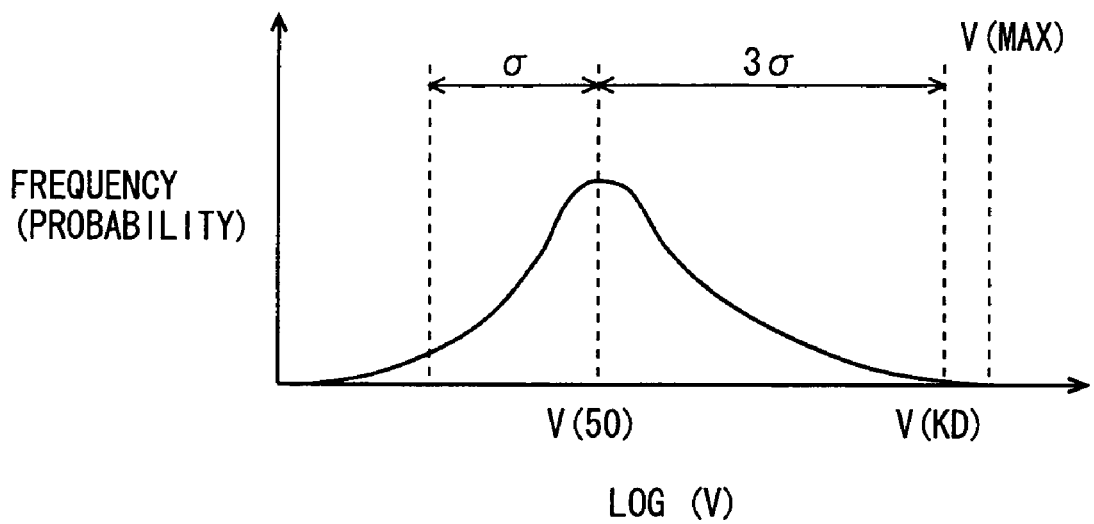
FIG. 10 is a chart showing frequency distribution of intensity values LOG(V) in a state where knocking has occurred (Ver. 2).

Further, if knocking occurrence frequency increases or mechanical vibration of engine 100 itself increases, maximum value V(MAX) is further incremented as shown in FIG. 10. At this time, both median V(50) and standard deviation σ in the frequency distribution are incremented corresponding to the maximum value V(MAX). Therefore, the knock determination level V(KD) becomes higher.

Intensity values LOG(V) smaller than knock determination level V(KD) are not determined as intensity values LOG (V) in a cycle where knocking has occurred. Therefore, when the knock determination level V(KD) becomes higher, frequency determined as knocking having not occurred increases although knocking has occurred.

In order to prevent knock determination level V(KD) from becoming higher as described above, if knock determination level V(KD) is smaller than maximum value V(MAX) (YES in S112), maximum value V(MAX) is removed from the frequency distribution (S114). The total frequency of removed maximum values V(MAX) is counted as knock occupancy KC (S116).

In the frequency distribution in which maximum value V(MAX) has been removed, maximum value V(MAX) is redetermined (S106). In other words, maximum value V(MAX) is corrected to be smaller in the frequency distribution.

Further, in the frequency distribution after maximum value V(MAX) is redetermined, knock determination level V(KD) is recalculated (S110). That is, knock determination level V(KD) in the frequency distribution for intensity values LOG (V) not more than redetermined maximum value V(MAX) is recalculated. As long as knock determination level V(KD) is smaller than maximum value V(MAX) (YES in S112), processing from S106 to S116 is repeated.

Figure 11:
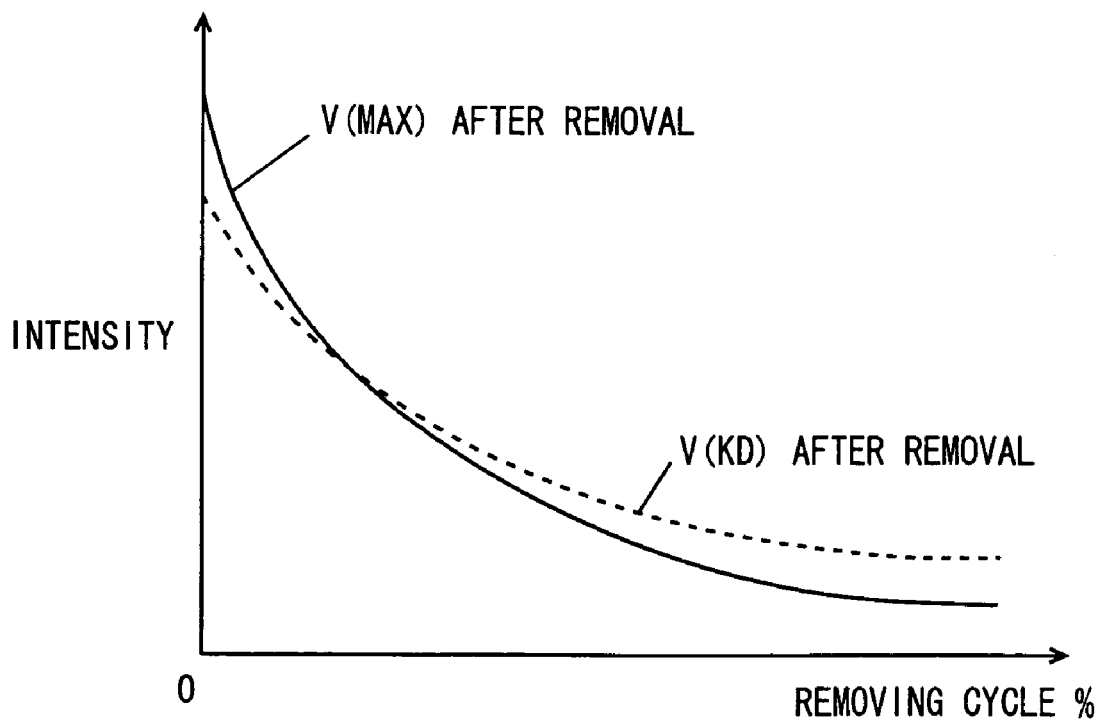
FIG. 11 is a chart showing transition of a maximum value V(MAX) and a knock determination level V(KD) in frequency distribution.

In the case where maximum values V(MAX) are removed and knock determination level V(KD) is recalculated, as removed maximum values V(MAX) increases (as maximum value V(MAX) in the frequency distribution is decremented), knock determination level V(KD) becomes lower, as shown in FIG. 11. The reduction rate of maximum value V(MAX) is larger than the reduction rate of knock determination level V(KD), so there is a point where the both coincide.

As described above, in the frequency distribution where knocking has not occurred, maximum value V(MAX) and knock determination level V(KD) coincide. Therefore, as shown in FIG. 12, if maximum value V(MAX) and knock determination level V(KD) coincide (NO in S112), this knock determination level V(KD) can be said to simulate a knock determination level V(KD) in frequency distribution where knocking has not occurred.

Therefore, the total frequency of intensity values LOG(V) larger than knock determination level V(KD) (maximum value V(MAX)) in the case where maximum value V(MAX) and knock determination level V(KD) coincide, that is, total frequency of maximum values (MAX), removed until maximum value V(MAX) and knock determination level V(KD) coincide, is counted as knock occupancy KC (knocking occurrence frequency) (S116).

Figure 13:
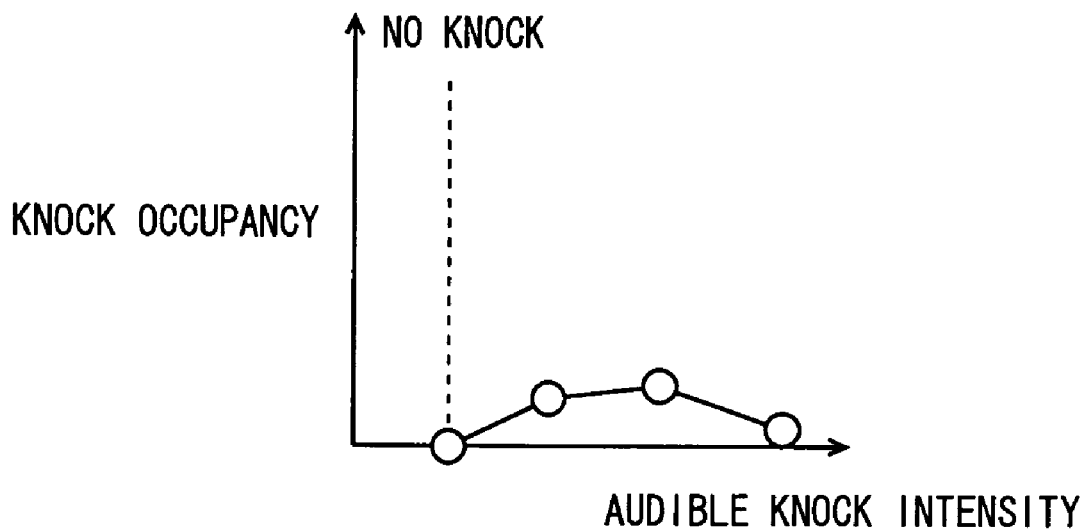
FIG. 13 is a chart showing the relationship between an audible knock intensity and knock occupancy KC (Ver. 1).

FIG. 13 shows a transition of knock occupancy KC when knock occupancy KC is counted, by using knock determination level V(KD) calculated while not removing maximum values V(MAX). In this case, as the audible knock intensity (intensity level audible by passengers) increases from a state of no knocking, knock occupancy KC increases. However, knock determination level V(KD) increases as maximum value V(MAX) increases, so if the audible knock intensity is too large, knock occupancy KC decreases in turn.

Figure 14:
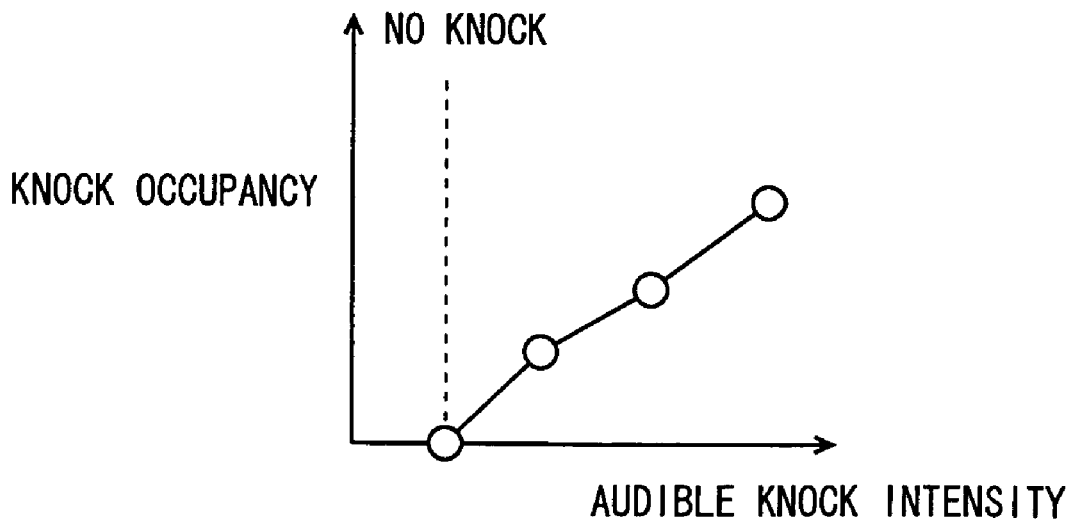
FIG. 14 is a chart showing the relationship between an audible knock intensity and knock occupancy KC (Ver. 2).

On the other hand, if knock determination level V(KD) is recalculated by removing maximum values V(MAX) until maximum value V(MAX) and knock determination level V(KD) coincide as shown in FIG. 14, knock occupancy KC increases as the audible knock intensity increases. Thereby, it is possible to detect knock occupancy KC with high accuracy.

If knock occupancy KC is larger than threshold KC(0) (YES in S118), it is said that knocking has occurred at higher frequency than the allowable frequency. In such a case, in order to make it easy to determine that knocking has occurred, determination value V(KX) is decremented (S120). Thereby, it is possible to suppress occurrence of knocking by increasing frequency that knocking is determined to have occurred and retarding ignition timing.

On the other hand, if knock occupancy KC is smaller than threshold KC(0) (NO in S118), the knocking occurrence frequency can be said as being within the allowable value. In such a case, it can be said that it is a state where output of engine 100 can be further increased.

Therefore, determination value V(KX) is incremented (S122). Thereby, it is possible to increase output of engine by suppressing frequency that knocking is determined to have occurred and retarding ignition timing.

As described above, the engine ECU of the knocking occurrence number determination device according to the present embodiment removes maximum values V(MAX) (first value) until maximum value V(MAX) and knock determination level V(KD) (second value) coincide, and calculates knock determination level V(KD) (second value). The total frequency of maximum values V(MAX) removed until maximum value V(MAX) (first value) and knock determination level V(KD) (second value) coincide is counted as knock occupancy KC. Thereby, as detected intensity V increases, knock determination level V(KD) (second value) increases, whereby it is possible to suppress a drop of knock occupancy KC regardless of knocking having occurred. Therefore, it is possible to determine the number of times that knocking has occurred with high accuracy.

Although, in the present embodiment, knock determination level V(KD) is recalculated by removing maximum values V(MAX) until knock determination level V(KD) and maximum value V(MAX) coincide, knock determination level V(KD) may be recalculated by removing maximum values V(MAX) until knock determination level V(KD) becomes not less than maximum value V(MAX).

Further, if maximum value V(MAX) in frequency distribution is extremely high due to divergent phenomenon (a case that knocking occurrence frequency is extremely high) for example, there is a case where knock determination level V(KD) is calculated as a value larger than maximum value V(MAX). Therefore, if knock determination level V(KD) is larger than maximum value V(MAX), knock determination level V(KD) may be recalculated by removing maximum values V(MAX) until knock determination level V(KD) coincide with maximum value V(MAX) or knock determination level V(KD) becomes not more than maximum value V(MAX).

Further, if the deviation between knock determination level V(KD) and maximum value V(MAX) is larger than a predetermined deviation, knock determination level V(KD) may be recalculated by removing maximum values V(MAX) until the deviation between knock determination level V(KD) and maximum value V(MAX) becomes smaller than the predetermined deviation.

Further, although, in the present embodiment, a peak value of the intensity detected by knock sensor 300 is used as intensity V used for calculating intensity values LOG(V), a peak value of the intensity of vibration components of an in-cylinder pressure detected by an in-cylinder pressure sensor for detecting an in-cylinder pressure of engine 100 may be used. In such a case, the in-cylinder pressure sensor may be provided integrally with an ignition plug provided at the cylinder center part in a planar view so as to detect the intensity of vibration components of pressure of the cylinder center part.

Further, for intensity V used for calculating intensity values LOG(V), a product of a peak value of the intensity detected by knock sensor 300 and correlation coefficient K in a cycle in which the peak value is detected may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knocking state determination device in an internal combustion engine, comprising:
    a knock intensity calculator calculating a knock intensity relating to an intensity of vibration caused due to knocking;
    an indicator indicating ignition timing of said internal combustion engine based on a result of comparing said knock intensity with a determination value;
    a detector for detecting a plurality of intensity values relating to an intensity of vibration caused in said internal combustion engine;
    a calculator for calculating a second value based on an intensity value not more than a first value chosen among said plurality of intensity values;
    a corrector for correcting said first value such that a deviation between said first value and said second value becomes smaller than a predetermined deviation when the deviation between said first value and said second value is larger than said predetermined deviation; and
    a determiner for determining a knocking occurrence state based on an intensity value larger than at least one value of said first value corrected and a second value calculated based on an intensity value not more than said first value corrected; and
    a determination value corrector correcting said determination value based on the knocking occurrence state determined based on said intensity value.

2. The knocking state determination device according to claim 1, wherein said determiner includes a number determiner which determines a number of intensity values larger than at least one value of said first value corrected and the second value calculated based on the intensity value not more than said first value corrected, as a number of times that knocking has occurred.

3. The knocking state determination device according to claim 1, further comprising:
a median calculator for calculating a median of intensity values not more than said first value; and
a standard deviation value calculator for calculating a standard deviation value from a minimum value of intensity values to an intensity value not more than said first value, wherein
said calculator calculates said second value by adding a product of a predetermined coefficient and said standard deviation value to said median.

4. The knocking state determination device according to claim 3, wherein said corrector corrects said first value to be decremented.

5. The knocking state determination device according to claim 1, further comprising an intensity detector for detecting an intensity of vibration caused by combustion of said internal combustion engine, wherein
said intensity value is a value in which a peak value of an intensity of vibration of said internal combustion engine in a predetermined crank angle is logarithmically converted.

6. The knocking state determination device according to claim 1, further comprising:
an intensity detector for detecting an intensity of vibration caused by combustion of said internal combustion engine;
a storage for previously storing a waveform of vibration of said internal combustion engine in a predetermined crank angle;
a waveform detector for detecting a waveform of vibration of said internal combustion engine in a predetermined crank angle; and
a deviation calculator for calculating a value relating to a deviation between said stored waveform and said detected waveform, based on a result of comparing said stored waveform with said detected waveform, wherein
said intensity value is a value in which a product of a peak value of the intensity of vibration of said internal combustion engine in said predetermined crank angle and a value relating to said deviation is logarithmically converted.

7. The knocking state determination device according to claim 1, further comprising an intensity detector for detecting an intensity of vibration of an in-cylinder pressure of said internal combustion engine, wherein
said intensity value is a value in which a peak value of the intensity of vibration of said in-cylinder pressure in a predetermined crank angle is logarithmically converted.

8. A knocking state determination device in an internal combustion engine, comprising:
means for calculating a knock intensity relating to an intensity of vibration caused due to knocking;
means for indicating ignition timing of said internal combustion engine based on a result of comparing said knock intensity with a determination value;
detection means for detecting a plurality of intensity values relating to an intensity of vibration caused in said internal combustion engine;
calculation means for calculating a second value based on an intensity value not more than a first value chosen among said plurality of intensity values;
correction means for correcting said first value such that a deviation between said first value and said second value becomes smaller than a predetermined deviation when the deviation between said first value and said second value is larger than said predetermined deviation;
determination means for determining a knocking occurrence state based on an intensity value larger than at least one of said first value corrected and a second value calculated based on an intensity value not more than said first value corrected; and
means for correcting said determination value based on the knocking occurrence state determined based on said intensity value.

9. The knocking state determination device according to claim 8, wherein said determination means includes number determination means which determines a number of intensity values larger than at least one value of said first value corrected and the second value calculated based on the intensity value not more than said first value corrected, as a number of times that knocking has occurred.

10. The knocking state determination device according to claim 8, further comprising:
means for calculating a median of intensity values not more than said first value; and
means for calculating a standard deviation value from a minimum value of intensity values to an intensity value not more than said first value, wherein
said calculation means includes means for calculating said second value by adding a product of a predetermined coefficient and said standard deviation value to said median.

11. The knocking state determination device according to claim 10, wherein said correction means includes means for correcting said first value to be decremented.

12. The knocking state determination device according to claim 8, further comprising means for detecting an intensity of vibration caused by combustion of said internal combustion engine, wherein
said intensity value is a value in which a peak value of an intensity of vibration of said internal combustion engine in a predetermined crank angle is logarithmically converted.

13. The knocking state determination device according to claim 8, further comprising:
means for detecting an intensity of vibration caused by combustion of said internal combustion engine;
means for previously storing a waveform of vibration of said internal combustion engine in a predetermined crank angle;
means for detecting a waveform of vibration of said internal combustion engine in a predetermined crank angle; and
means for calculating a value relating to a deviation between said stored waveform and said detected waveform, based on a result of comparing said stored waveform with said detected waveform, wherein
said intensity value is a value in which a product of a peak value of the intensity of vibration of said internal combustion engine in said predetermined crank angle and a value relating to said deviation is logarithmically converted.

14. The knocking state determination device according to claim 8, further comprising means for detecting an intensity of vibration of an in-cylinder pressure of said internal combustion engine, wherein
said intensity value is a value in which a peak value of the intensity of vibration of said in-cylinder pressure in a predetermined crank angle is logarithmically converted.

15. A knocking state determination device in an internal combustion engine, comprising:

an ECU, wherein said ECU calculates a knock intensity relating to an intensity of vibration caused due to knocking.

indicates ignition timing of said internal combustion engine based on a result of comparing said knock intensity with a determination value, detects a plurality of intensity values relating to an intensity of vibration caused in said internal combustion engine, calculates a second value based on an intensity value not more than a first value chosen among said plurality of intensity values, corrects said first value such that a deviation between said first value and said second value becomes a predetermined deviation when the deviation between said first value and said second value is larger than the predetermined deviation;

determines a knocking occurrence state based on an intensity value larger than at least one value of said first value corrected and a second value calculated based on an intensity value not more than said first value corrected, and corrects said determination value based on the knocking occurrence state determined based on said intensity value.

* * * * *